United States Patent
Lamontia et al.

(10) Patent No.: US 9,188,258 B2
(45) Date of Patent: Nov. 17, 2015

(54) MULTILAYER REINFORCED HOSE

(71) Applicant: E I DU PONT DE NEMOURS AND COMPANY, Wilmington (DE)

(72) Inventors: Mark Allan Lamontia, Landenberg, PA (US); Caio P. Faury, Barueri (BR); David William Litchfield, Midlothian, VA (US)

(73) Assignee: E I DU PONT NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 14/501,128

(22) Filed: Sep. 30, 2014

(65) Prior Publication Data

US 2015/0090358 A1    Apr. 2, 2015

Related U.S. Application Data

(60) Provisional application No. 61/885,633, filed on Oct. 2, 2013.

(51) Int. Cl.
| | |
|---|---|
| *F16L 11/10* | (2006.01) |
| *F16L 11/08* | (2006.01) |
| *B32B 5/02* | (2006.01) |
| *B32B 27/34* | (2006.01) |
| *B32B 1/08* | (2006.01) |

(52) U.S. Cl.
CPC ............... *F16L 11/087* (2013.01); *B32B 1/08* (2013.01); *B32B 5/022* (2013.01); *B32B 5/024* (2013.01); *B32B 5/026* (2013.01); *B32B 27/34* (2013.01); *F16L 11/082* (2013.01); *F16L 11/083* (2013.01); *F16L 11/086* (2013.01)

(58) Field of Classification Search
CPC ........ F16L 11/08; F16L 11/085; F16L 11/086; F16L 11/087

USPC ........................................ 138/123, 124, 125
See application file for complete search history.

(56) References Cited

U.S. PATENT DOCUMENTS

| | | | |
|---|---|---|---|
| 3,094,511 A | 6/1963 | DuPont | |
| 3,354,127 A | 11/1968 | DuPont | |
| 3,673,143 A | 6/1972 | Bair et al. | |
| 3,767,756 A | 10/1973 | Blades | |
| 3,819,587 A | 6/1974 | Kwoleck | |
| 3,869,429 A | 3/1975 | Blades | |
| 3,869,430 A | 3/1975 | Blades | |
| 3,905,398 A * | 9/1975 | Johansen et al. | 138/124 |
| 4,172,938 A | 10/1979 | Mera et al. | |
| 4,384,595 A * | 5/1983 | Washkewicz et al. | 138/127 |
| 4,585,035 A * | 4/1986 | Piccoli | 138/127 |
| 4,699,178 A * | 10/1987 | Washkewicz | D04C 1/06 138/125 |
| 5,372,163 A * | 12/1994 | Kokuryu et al. | 138/126 |
| 5,378,538 A * | 1/1995 | Makino et al. | 428/364 |
| 6,112,771 A * | 9/2000 | Aoyagi et al. | 138/127 |
| 6,179,008 B1 * | 1/2001 | Kawazura et al. | 138/125 |
| 6,736,167 B2 * | 5/2004 | Mizutani et al. | 138/126 |
| 2004/0154676 A1 * | 8/2004 | Wilkinson | 138/125 |
| 2013/0000767 A1 | 1/2013 | Nonaka et al. | |

OTHER PUBLICATIONS

Man-Made Fibers, Science and Technology, vol. 2, p. 297, W. Black et al., Interscience Publishers, 1968.

* cited by examiner

Primary Examiner — James Hook

(57) ABSTRACT

This invention pertains to an umbilical hose comprising in order a thermoplastic inner liner, at least one fibrous reinforcement layer having a layer thickness no greater than 1.5 mm, comprising continuous filament yarns having a yarn tenacity of at least 13 g/dtex and a linear density no greater than 6667 dtex, and a thermoplastic outer cover.

8 Claims, 1 Drawing Sheet

MULTILAYER REINFORCED HOSE

BACKGROUND

1. Field of the Invention

This invention pertains to a multilayer reinforced hose that is particularly suitable for use in a service umbilical.

2. Description of Related Art

Hoses used in umbilicals contain layers of reinforcing fibers braided over a thermoplastic polymer liner. A common cause of hose failure is reinforcement failure. There is a need, therefore, to provide solutions that can extend the useful life of reinforcement layers in an umbilical hose.

United States patent application publication number 2013/0000767 to Nonaka et al describes a method of manufacturing a rubber hose that includes an inner rubber tube having a hollow portion, first and second braided layers formed by braiding strands, and an outer rubber tube. The method includes forming a laminated structure by sequentially forming the first braided layer on the inner rubber tube, a thermoplastic resin layer including a thermoplastic resin on the first braided layer, the second braided layer on the thermoplastic resin layer, and the outer rubber tube on the second braided layer, vulcanizing the inner rubber tube and the outer rubber tube and softening the thermoplastic resin layer by heating the laminated structure to not lower than a softening temperature of the thermoplastic resin layer, and integrating the first and second braided layers by softening the thermoplastic resin layer and then solidifying the soft thermoplastic resin penetrated into mesh openings formed between the strands.

SUMMARY OF THE INVENTION

This invention pertains to an umbilical hose comprising in order:
  (i) a thermoplastic inner liner,
  (ii) at least one fibrous reinforcement layer having a layer thickness no greater than 1.5 mm, comprising continuous filament yarns having a yarn tenacity of at least 13 g/dtex and a linear density no greater than 6667 dtex, and
  (iii) a thermoplastic outer cover.

DETAILED DESCRIPTION

Umbilical

Figure 1:
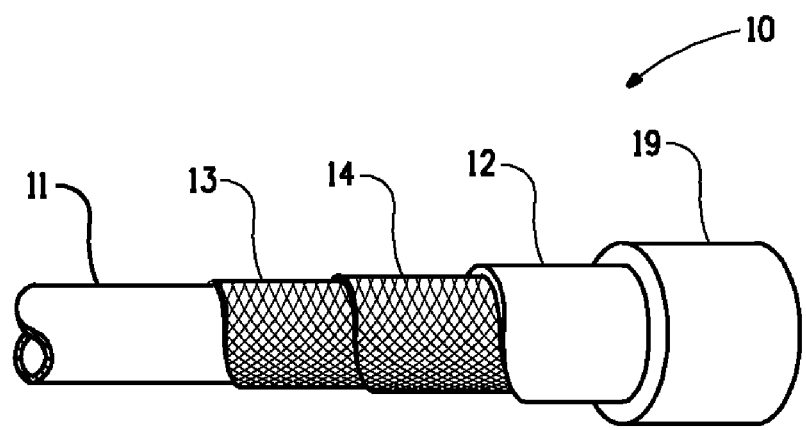
FIG. 1 depicts a partly cutaway perspective of one embodiment of a hose comprising two reinforcement layers.

An example of an umbilical thermoplastic hose (hereinafter called 'hose') is shown, generally, at 10 in FIG. 1. The hose has couplings 19 attached to both ends. The hose comprises a thermoplastic polymeric inner liner 11 and a thermoplastic polymeric outer cover 12. Located between the liner and cover are two fibrous reinforcement layers, a first fibrous layer 13 and a second fibrous layer 14. 'Hydraulic' embodiments of the hose must resist internal hydrostatic pressure only, and liner 11 is the innermost layer. 'HCR' (High Collapse Resistance) embodiments of a hose must withstand both internal and external hydrostatic pressure, and contain an interlocking stainless steel carcass, not shown, as the innermost component. The present invention pertains to fibrous reinforcing layers and applies to both 'hydraulic' and 'HCR' hoses.

Figure 2:
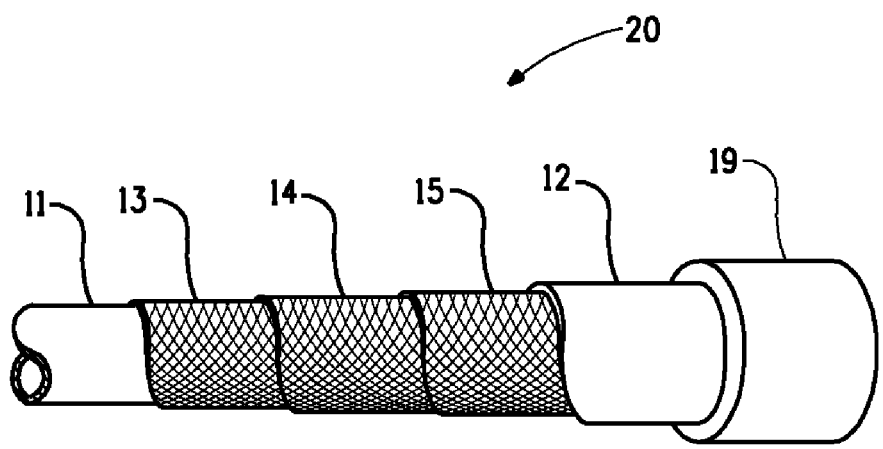
FIG. 2 depicts a partly cutaway perspective of a hose comprising three reinforcement layers.

FIG. 2 shows at 20 another embodiment of a hose comprising three fibrous reinforcement layers.

Inner Liner

Suitable inner liner hose materials include aliphatic polyamide or polyvinylidenefluoride. A suitable polyamide is Nylon 11.

Outer Cover

Suitable hose outer cover materials include polyethylene, polyurethane, polyethylene, polypropylene, and aliphatic polyamide. A suitable polyamide is Nylon 12.

Reinforcement Layers

The hose comprises a plurality of fibrous reinforcement layers as is shown at 13-14 in FIG. 1 and at 13-15 in FIG. 2. Preferably the layers are in the form of a braided fabric, a woven fabric, a spiral fabric, or a unidirectional fabric. A braided fabric is formed by plaiting several strands of fibrous yarn. The yarns are interlaced diagonally to the axial direction of the hose.

A woven fabric comprises warp and fill yarns, interlaced orthogonally to each other—the warp yarns being parallel to the fabric production direction. The woven fabric can be a plain weave, crowfoot weave, basket weave, satin weave, twill weave, unbalanced weave, or any other weave style.

All unidirectional fabric reinforcement yarns are aligned in the direction parallel to the fabric production direction. There may be a few lightweight yarns in the fill direction used to help maintain the alignment of the reinforcement yarns. When woven or unidirectional fabrics are used, the fabric width is preferably less than 25 mm, that is to say that the fabrics are considered to be narrow fabrics.

The reinforcement layer yarns comprise a plurality of continuous filaments. The terms fiber and filament may be used interchangeably. By continuous, is meant that the fibers have a high length-to-diameter ratio. Typically a bobbin of continuous filament yarn has a length of several thousand meters. A typical filament diameter is about 0.015 mm.

In some embodiments, the continuous filament yarns may be twisted or entangled. Twisting is the process of combining two or more singles yarns into a plied yarn or cord. In some embodiments, the twist level as described by a twist multiplier ranges from zero to 2.5. As used here, twist multiplier is as defined in ASTM D123-12. An entangled yarn or cord is one in which at least two singles yarns are intermixed with each other without adding twist or otherwise disturbing the parallel relationship of the combined filaments. This is also known as comingling or compacting. Twisting and entangling are well known terms in the textile art.

The reinforcement layer yarns of this invention have a tenacity of at least 13 grams force per dtex. In some embodiments, the yarn tenacity is at least 18 grams force per dtex or even 25 grams force per dtex. The yarns also have an initial modulus of at least 500 grams force per dtex or even 750 grams force per dtex. In some embodiments, the yarn modulus is at least 900 grams force per dtex. In some embodiments, the linear density of the yarns is no greater than 6000 denier (6667 dtex). In some other embodiments, the linear density of the yarns is from 3000 to 6000 denier (3333 to 6667 dtex).

A requirement of this invention is that there is at least one fibrous reinforcement layer having a thickness no greater than 1.5 mm. In another embodiment, as shown in FIG. 1, the hose comprises two fibrous reinforcement layers 13 and 14 having a thickness no greater than 1.5 mm.

FIG. 2 shows a hose comprising three fibrous reinforcement layers 13, 14 and 15 having a layer thickness no greater than 1.5 mm. Other embodiments may comprise four or more layers all having a thickness no greater than 1.5 mm. In some embodiments, the number of fibrous reinforcement layers having a thickness no greater than 1.5 mm is from two to seven or even from three to five. The reinforcement layers having a thickness no greater than 1.5 mm may have all the same thickness or be of different thickness.

In some embodiments, the reinforcement layer thickness is no greater than 1.4 mm. In yet other embodiments, the reinforcement layer thickness is no greater than 1.3 mm or even 1.27 mm.

In some embodiments, the number of reinforcement layers having a thickness of less than 1.5 mm is from 2 to 10. In some other embodiments, the number of reinforcement layers having a thickness of less than 1.5 mm is from 2 to 7. In yet other embodiments, the number of reinforcement layers having a thickness of less than 1.5 mm is from 2 to 5.

There may also be at least one fibrous reinforcement layer having a thickness greater than 1.5 mm present in the hose.

Reinforcement Fibers

Preferably the continuous filament yarns of the reinforcement layers are of aromatic polyamide or aromatic co-polyamide. A preferred aromatic polyamide is p-aramid that is available from E.I. DuPont de Nemours, Wilmington, Del. under the tradename Kevlar® or from Teijin Aramid, Conyers, Ga. under the tradenames Twaron® and Technora®.

As used herein, the term para-aramid filaments means filaments made of para-aramid polymer. The term aramid means a polyamide wherein at least 85% of the amide (—CONH—) linkages are attached directly to two aromatic rings. Suitable aramid fibers are described in Man-Made Fibres—Science and Technology, Volume 2, in the section titled Fibre-Forming Aromatic Polyamides, page 297, W. Black et al., Interscience Publishers, 1968. Aramid fibers and their production are, also, disclosed in U.S. Pat. Nos. 3,767,756; 4,172,938; 3,869,429; 3,869,430; 3,819,587; 3,673,143; 3,354,127; and 3,094,511.

The preferred para-aramid is poly (p-phenylene terephthalamide) which is called PPD-T. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloro-terephthaloyl chloride or 3,4'-diaminodiphenylether. In some preferred embodiments, the yarns of the Fiber—resin composite consist solely of PPD-T filaments; in some preferred embodiments, the layers in the fiber—resin composite consist solely of PPD-T yarns; in other words, in some preferred embodiments all filaments in the fiber—resin composite are PPD-T filaments.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

Another suitable fiber is one based on aromatic copolyamide prepared by reaction of terephthaloyl chloride (TPA) with a 50/50 mole ratio of p-phenylene diamine (PPD) and 3,4'-diaminodiphenyl ether (DPE). Yet another suitable fiberis that formed by polycondensation reaction of two diamines, p-phenylene diamine and 5-amino-2-(p-aminophenyl)benzimidazole with terephthalic acid or anhydrides or acid chloride derivatives of these monomers.

EXAMPLES

The burst pressure of an umbilical hose was modeled using cylinder pressure vessel equations for layered cylinders that were converted for fiber-reinforced layers using the yarn tenacity, the number of yarns present, and the braid angles of the examples. These equations are well known engineering mechanics principles. Burst pressure is reached upon failure of the critical layer. The predicted burst pressure values will be higher than in an in-service hose but they correctly show the relationship between inventive and comparative examples.

The hose modeled was a 12.7 mm (0.5 inch) internal diameter High Collapse Resistance 'HCR' hose. Examples prepared according to the current invention are indicated by numerical values. Control or Comparative Examples are indicated by letters.

Each hose modeled comprised, in order, an interlocking carcass, a thermoplastic inner liner, fibrous reinforcement braid layers and a thermoplastic outer cover as components.

The carcass, inner liner and outer cover components all replicated ones that are in commercial use. The carcass component was of stainless steel, had a 12.7 mm inner diameter and was 1.6 mm thick. The Nylon 11 inner liner component had a 15.9 mm inner diameter and was 1.3 mm thick. The polyurethane outer cover component covered the last reinforcement layer.

In Comparative Example A, the hose had two fibrous reinforcement layers. The first and second fibrous reinforcement layers were both braids comprising para-aramid Kevlar® 129 yarn from DuPont, having 24 braid plates with each braid plate being of 32000 dtex (28800 denier) linear density, 30 g/dtex (27.5 gpd) tenacity, and 833 g/dtex (750 gpd) modulus. The first reinforcement layer was 2.26 mm thick and the second reinforcement layer was 1.88 mm thick.

In Example 1, the hose had three fibrous reinforcement layers. The first, second and third fibrous reinforcement layers were all braids comprising para-aramid Kevlar® 129 yarn having 24 braid plates. The first reinforcement layer had braid plates of 24000 dtex (21600 denier) linear density, 30 g/dtex (27.5 gpd) tenacity, 833 g/dtex (750 gpd) modulus and was 1.40 mm thick. The second and third reinforcement layers had braid plates of 20000 dtex (18000 denier) linear density, 30 g/dtex (27.5 gpd) tenacity, and 833 g/dtex (750 gpd) modulus. The second reinforcement layer was 1.23 mm thick and the third reinforcement layer was 1.08 mm thick.

The modeled hoses of Example 1 and Comparative Example A gave burst pressure predictions as shown in Table 1. It is seen that the predicted burst pressure for Example 1 was higher than the burst pressure for Comparative Example A.

In Comparative Example B, the hose had two reinforcement layers. The first fibrous reinforcement layer had a braid comprising para-aramid Kevlar® 29AP yarn having 24 braid plates with each braid plate being of 40000 dtex (36000 denier) linear density, 29 g/dtex (26 gpd) tenacity, 666 g/dtex (600 gpd) modulus and was 3.04 mm thick. The second fibrous reinforcement layer had a braid comprising para-aramid Kevlar® 129 yarn having 24 braid plates with each braid plate being of 32000 dtex (28800 denier) linear density, 30 g/dtex (27.5 gpd) tenacity, 833 g/dtex (750 gpd) modulus and was 1.73 mm thick.

In Example 2, the hose had three fibrous reinforcement layers. The first and second fibrous reinforcement layers have braids comprised para-aramid Kevlar® 29AP yarn having 24 braid plates with each braid plate being of 20000 dtex (18000 denier) linear density, 29 g/dtex (26 gpd) tenacity, and 666 g/dtex (600 gpd) modulus. The first reinforcement layer was 1.09 mm thick and the second reinforcement layer 0.98 mm thick. The third fibrous reinforcement was a braid comprising para-aramid Kevlar® 129 yarn having 24 braid plates with each braid plate being of 32000 dtex (28800 denier) linear density, 30 g/dtex (27.5 gpd) tenacity, 833 g/dtex (750 gpd) modulus and was 1.66 mm thick.

The modeled hoses of Example 2 and Comparative Example B gave burst pressure predictions as shown in Table 1. It is seen that the predicted burst pressure for Example 2 was higher the burst pressure for Comparative Example B.

In Comparative Example C, the hose had two fibrous reinforcement layers. The first and second fibrous reinforcement layers were both braids comprising para-aramid Kevlar® 129 yarn having 24 braid plates with each braid plate being of 40000 dtex (36000 denier) linear density, 30 g/dtex (27.5 gpd) tenacity and 833 g/dtex (750 gpd) modulus. The first reinforcement layer was 2.89 mm thick and the second reinforcement layer was 2.41 mm thick.

In Example 3, the hose had three fibrous reinforcement layers. The first, second and third fibrous reinforcement layers were all braids comprising para-aramid Kevlar® 129 yarn having 24 braid plates. The first reinforcement layer had braid plates of 24000 dtex (21600 denier) linear density, 30 g/dtex (27.5 gpd) tenacity, 833 g/dtex (750 gpd) modulus and was 1.65 mm thick. The second reinforcement layer had braid plates of 16000 dtex (21600 denier) linear density, 30 g/dtex (27.5 gpd) tenacity, 833 g/dtex (750 gpd) modulus and was 0.67 mm thick. The third reinforcement layers had braid plates of 40000 dtex (18000 denier) linear density, 30 g/dtex (27.5 gpd) tenacity, and 833 g/dtex (750 gpd) modulus and was 2.26 mm thick.

The modeled hoses of Example 3 and Comparative Example C gave burst pressure predictions as shown in Table 1. It is seen that the predicted burst pressure for Example 3 was higher than the burst pressure for Comparative Example C.

TABLE 1

| | Thickness Layer 1 (mm) | Thickness Layer 2 (mm) | Thickness Layer 3 (mm) | Total Layer Thickness 1 + 2 + 3 (mm) | Burst Pressure (MPa) |
| --- | --- | --- | --- | --- | --- |
| Comparative Example A | 2.26 | 1.88 | — | 4.14 | 586 |
| Example 1 | 1.40 | 1.23 | 1.08 | 3.71 | 622 |
| Comparative Example B | 3.04 | 1.73 | — | 4.77 | 627 |
| Example 2 | 1.09 | 0.98 | 1.66 | 3.73 | 710 |
| Comparative Example C | 2.89 | 2.41 | — | 5.30 | 676 |
| Example 3 | 1.65 | 0.67 | 2.26 | 4.58 | 700 |

Example 1 in which first and second reinforcement layers are no thicker than 1.40 mm showed a 6 percent improvement in burst pressure when compared with Comparative Example A in which the lowest reinforcement layer thickness was 1.88 mm. Not only was there a higher burst pressure containment, but the total reinforcement layer thickness of Example 1, in which all three reinforcement layers had a thickness of less than 1.5 mm, was 11 percent thinner than that of Comparative Example A.

Example 2 in which the first two reinforcement layers were no thicker than 1.4 mm showed a 13 percent improvement in burst pressure when compared with Comparative Example B in which the thinnest reinforcement layer was 1.73 mm. Not only was there a higher burst pressure containment, but the total reinforcement layer thickness of Example 2 was 22 percent thinner than that of Comparative Example B.

Example 3 in which only one of the reinforcement layers, the second layer, had a thickness of less than 1.5 mm showed a 4 percent improvement in burst pressure when compared with Comparative Example C in which the thinnest reinforcement layer was 2.41 mm. Not only was there a higher burst pressure containment, but the total reinforcement layer thickness of Example 3 was 14 percent thinner than that of Comparative Example C. This shows that improvement can be obtained even with only one reinforcement layer having a thickness no greater than 1.5 mm.

What is claimed is:

1. A hose comprising in order:
   a thermoplastic inner liner,
   from two to seven fibrous reinforcement layers having a layer thickness no greater than 1.5 mm, comprising continuous filament yarns having a yarn tenacity of at least 18 g/dtex, a modulus of at least 500 g/dtex, and a linear density no greater than 6667 dtex, and
   a thermoplastic outer cover,
   wherein
   (i) the continuous filament yarns are of aromatic polyamide or aromatic co-polyamide, and
   (ii) the hose is a component of an umbilical.

2. The hose of claim 1, wherein the fibrous reinforcement layer thickness is no greater than 1.4 mm.

3. The hose of claim 2, wherein the fibrous reinforcement layer thickness is no greater than 1.3 mm.

4. The hose of claim 3, wherein the fibrous reinforcement layer thickness is no greater than 1.27 mm.

5. The hose of claim 1, wherein there are at least two reinforcement layers of a different thickness.

6. The hose of claim 5, wherein the layers are arranged such that the layer thickness increases outwards from the inner liner.

7. The hose of claim 1, wherein the reinforcement layers are in the form of a braid, woven fabric or spiral.

8. The hose of claim 1, wherein the aromatic polyamide is p-aramid.

* * * * *